(12) United States Patent
Gao et al.

(10) Patent No.: US 11,799,174 B2
(45) Date of Patent: Oct. 24, 2023

(54) BATTERY MODULE

(71) Applicant: CONTEMPORARY AMPEREX TECHNOLOGY CO., LIMITED, Ningde (CN)

(72) Inventors: Hanqing Gao, Ningde (CN); Xiaowei Hu, Ningde (CN); Chuanlian Chen, Ningde (CN); Jihua Yao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 537 days.

(21) Appl. No.: 17/127,585

(22) Filed: Dec. 18, 2020

(65) Prior Publication Data

US 2021/0111467 A1 Apr. 15, 2021

Related U.S. Application Data

(63) Continuation of application No. PCT/CN2019/105370, filed on Sep. 11, 2019.

(30) Foreign Application Priority Data

Sep. 14, 2018 (CN) .......................... 201821509925.9

(51) Int. Cl.
*H01M 50/00* (2021.01)
*H01M 50/505* (2021.01)
(Continued)

(52) U.S. Cl.
CPC ....... *H01M 50/505* (2021.01); *H01M 50/209* (2021.01); *H01M 50/50* (2021.01); *H01M 50/548* (2021.01)

(58) Field of Classification Search
CPC ............. H01M 50/522; H01M 50/507; H01M 50/209; H01M 10/42; H01M 10/0525; H01M 50/505; Y02E 60/10
See application file for complete search history.

(56) References Cited

U.S. PATENT DOCUMENTS 9,634,445 B1 * 4/2017 Brandon .................. H01R 4/48
2016/0164063 A1 6/2016 Angerbauer et al.
2021/0288385 A1 9/2021 Jin et al.

FOREIGN PATENT DOCUMENTS

| CN | 201682022 U | 12/2010 |
| CN | 101944582 A | 1/2011 |

(Continued)

OTHER PUBLICATIONS

Contemporary Amperex Technology Co., Limited, Extended European Search Report, EP19859985.4, dated Sep. 27, 2021, 7 pgs.

(Continued)

*Primary Examiner* — Cynthia H Kelly
*Assistant Examiner* — Monique M Wills
(74) *Attorney, Agent, or Firm* — Kilpatrick Townsend & Stockton LLP

(57) ABSTRACT

This application provides a battery module including a first battery sequence, a second battery sequence, a first output electrode component, a second output electrode component, and a busbar assembly. The first batteries include a first electrode terminal, and the second batteries include a second electrode terminal. The busbar assembly includes first, second, and third busbar components. The first busbar component is connected to the first electrode terminal, the second busbar component is connected to the second electrode terminal, and the third busbar component connects the first electrode terminal and the second electrode terminal. The first output electrode component is connected to the first electrode terminal. The second output electrode component is connected to the second electrode terminal. The first battery connected to the first output electrode component and the second battery connected to the second output electrode component are located at the same end of the battery module.

20 Claims, 7 Drawing Sheets

(51) Int. Cl.
*H01M 50/548* (2021.01)
*H01M 50/209* (2021.01)
*H01M 50/50* (2021.01)

(56) References Cited

FOREIGN PATENT DOCUMENTS

| | | |
|---|---|---|
| CN | 208819967 U | 5/2019 |
| DE | 102013213527 A1 | 1/2015 |
| EP | 3817124 A1 | 5/2021 |
| JP | 2012243597 A | 12/2012 |
| JP | 2014203747 A | 10/2014 |

OTHER PUBLICATIONS

Contemporary Amperex Technology Co., Limited, International Search Report and Written Opinion, PCTCN2019105370, dated Dec. 19, 2019, 14 pgs.

* cited by examiner

BATTERY MODULE

CROSS-REFERENCE TO RELATED APPLICATIONS

This application is a continuation application of PCT Patent Application No. PCT/CN2019/105370, entitled "BATTERY MODULE" filed on Sep. 11, 2019, which claims priority to Chinese Patent Application No. 201821509925.9, filed with the State Intellectual Property Office of the People's Republic of China on Sep. 14, 2018, entitled "BATTERY MODULE", all of which are incorporated herein by reference in their entirety.

TECHNICAL FIELD

This application relates to the field of batteries, and in particular, to a battery module.

BACKGROUND

An existing battery module generally includes a plurality of batteries. The plurality of batteries are arranged in a row and connected together. Because the plurality of batteries are arranged in a row, positive and negative output electrodes of the battery module are generally disposed at two ends of the battery module along the arrangement direction. A typical battery pack includes a plurality of battery modules. The plurality of battery modules are connected by the positive and negative output electrodes. If the positive and negative output electrodes are disposed at the two ends of the battery module along the arrangement direction, an adverse effect will be caused to connection between the battery modules, a connection structure will be complicated, and an energy density of the battery pack will be affected.

SUMMARY

In view of problems in the prior art, an objective of this application is to provide a battery module to implement same-side output of the battery module and simplify a structure of the battery module.

To achieve the above objective, this application provides a battery module including a first battery sequence, a second battery sequence, a first output electrode component, a second output electrode component, and a busbar assembly. The first battery sequence includes a plurality of first batteries arranged along a longitudinal direction of the battery module, the second battery sequence includes a plurality of second batteries arranged along the longitudinal direction, and the first battery sequence and the second battery sequence are laid out along a transverse direction of the battery module that is perpendicular to the longitudinal direction. The first batteries include a first electrode terminal, and the second batteries include a second electrode terminal.

The busbar assembly includes a first busbar component, a second busbar component, and a third busbar component. The first busbar component is connected to the first electrode terminal, the second busbar component is connected to the second electrode terminal, and the third busbar component connects the first electrode terminal and the second electrode terminal. The first output electrode component is connected to the first electrode terminal of a first battery within the first battery sequence. The second output electrode component is connected to the second electrode terminal of a second battery within the second battery sequence. The first battery connected to the first output electrode component and the second battery connected to the second output electrode component are located at the same end of the battery module along the longitudinal direction.

The first output electrode component extends beyond an outer side of the first battery sequence along the longitudinal direction, and the second output electrode component extends beyond an outer side of the second battery sequence along the longitudinal direction.

In an embodiment, the first electrode terminal of the first battery and the second electrode terminal of the second battery are disposed opposite to each other along the transverse direction; and the busbar assembly is disposed between the first battery sequence and the second battery sequence.

The battery module further includes a spacer plate disposed between the first battery sequence and the second battery sequence. The spacer plate separates the first busbar component from the second busbar component, and separates the first output electrode component from the second output electrode component. A limiting slot is disposed on the spacer plate. The first output electrode component, the second output electrode component, and the busbar assembly are at least partly accommodated in the limiting slot.

The third busbar component includes a first part, a second part, and a third part. The first part is connected to the first battery. The second part is connected to the second battery. The third part is bent against the first part and the second part, and the third part connects the first part and the second part.

The third busbar component is a U-shaped integrated component; or the first part and the third part are an L-shaped integrated component, and the third part is connected to the second part. Alternatively, the third part includes a first connecting region and a second connecting region. The first part and the first connecting region are an L-shaped integrated component. The second part and the second connecting region are an L-shaped integrated component. The first connecting region is connected to the second connecting region.

The spacer plate separates the first part from the second part. The third part is located on an outer side of the spacer plate along the longitudinal direction. The first output electrode component is flush with the second output electrode component along a height direction.

In another embodiment, the first electrode terminal is disposed on an upper side of the first battery along the height direction, and the second electrode terminal is disposed on an upper side of the second battery along the height direction; and the battery module further includes a spacer plate disposed between the first battery sequence and the second battery sequence.

Beneficial effects of this application are as follows: by arranging the batteries in two rows, this application can not only increase a capacity of the battery module, but also dispose the first output electrode component and the second output electrode component at the same end of the battery module along the longitudinal direction to achieve the same-side output of the battery module and simplify a connection structure between battery modules.

Figure 1:
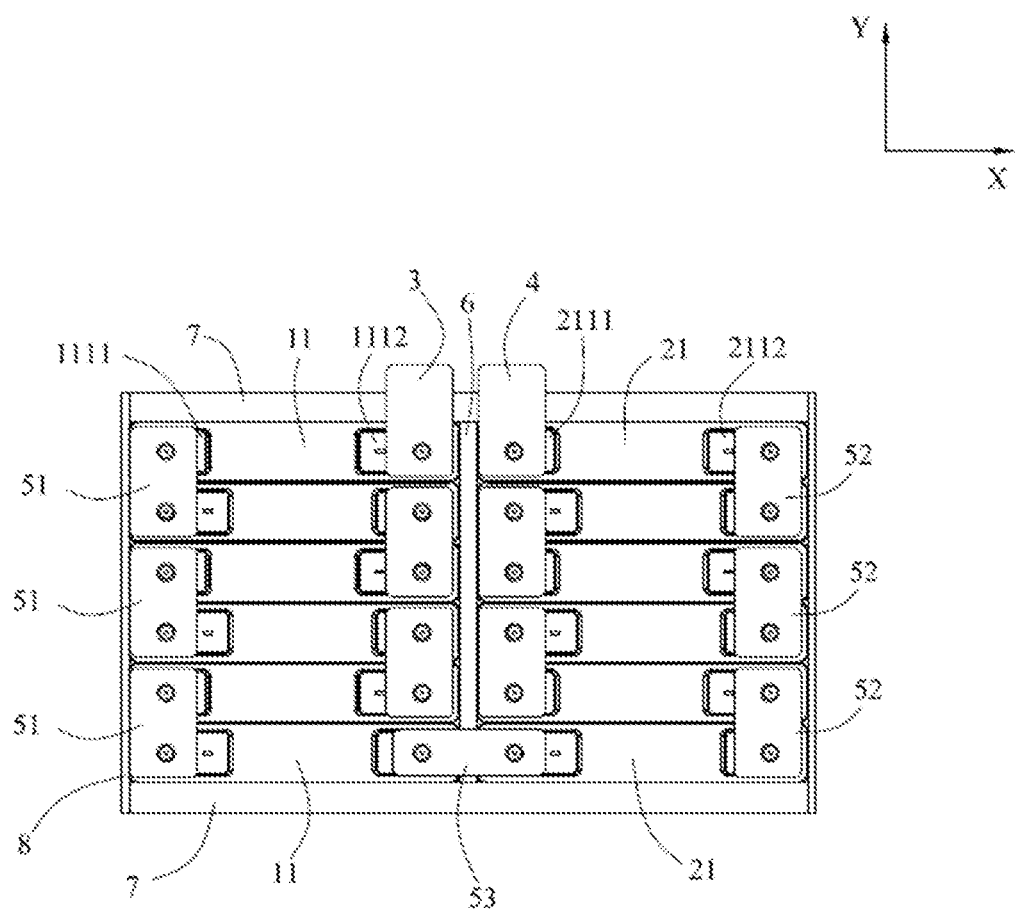
FIG. 1 is a schematic diagram of a first embodiment of a battery module according to this application.

Reference numerals are as follows:
1: First battery sequence;
11: First battery;
111: First electrode terminal;
1111: First positive terminal;
1112: First negative terminal;
2: Second battery sequence;
21: Second battery;
211: Second electrode terminal;
2111: Second positive terminal;
2112: Second negative terminal;
3: First output electrode component;
4: Second output electrode component;
5: Busbar assembly;
51: First busbar component;
52: Second busbar component;
53: Third busbar component;
531: First part;
532: Second part;
533: Third part;
5331: First connecting region;
5332: Second connecting region;
6: Spacer plate;
61: Limiting slot;
7: End plate;
8: Side plate;
X: Transverse direction;
Y: Longitudinal direction; and
Z: Height direction

DESCRIPTION OF EMBODIMENTS

To make the objectives, technical solutions, and advantages of this application clearer, the following describes this application in further detail with reference to accompanying drawings and embodiments. Understandably, the specific embodiments described herein are merely intended to explain this application, but are not intended to limit this application.

In the description of this application, unless otherwise expressly specified, the terms "first", "second", and "third" are for the sole purpose of description rather than indicating or implying any order of preference; the term "a plurality of" means two or more; unless otherwise expressly specified, the terms such as "connect" and "fix" shall be understood in a broad sense. For example, a "connection" may be a fixed connection, or a detachable connection, or an integrated connection, or an electrical connection; or may be a direct connection or an indirect connection implemented through an intermediate medium. A person of ordinary skill in the art can understand the specific meanings of the terms in this application according to the context.

Understandably, in the description of this application, localizers such as "on", "above", "under", and "below" described in the embodiments of this application are described from a perspective shown in the drawings, and shall not be understood as a limitation on the embodiments of this application. In addition, understandably, depending on the context, one element described as being connected "on" or "under" another element not only means that the element may be directly connected "on" or "under" the other element, but also means that the element may be indirectly connected "on" or "under" the other element through an intermediate element. The following describes this application in further detail with reference to specific embodiments and accompanying drawings.

Referring to FIG. 1, in a first embodiment, a battery module includes a first battery sequence 1, a second battery sequence 2, a first output electrode component 3, a second output electrode component 4, a busbar assembly 5, end plates 7, and side plates 8.

The first battery sequence 1 includes a plurality of first batteries 11 arranged along a longitudinal direction Y of the battery module. The second battery sequence 2 includes a plurality of second batteries 21 arranged along the longitudinal direction Y. The first battery sequence 1 and the second battery sequence 2 are laid out along a transverse direction X of the battery module that is perpendicular to the longitudinal direction. The first batteries 11 and the second batteries 21 may be prismatic lithium-ion batteries.

The first batteries 11 include two first electrode terminals 111, that is, a first positive terminal 1111 and a first negative terminal 1112. The second batteries 21 include two second electrode terminals 211, that is, a second positive terminal 2111 and a second negative terminal 2112.

Two end plates 7 and two side plates 8 are interconnected to form a frame. The first battery sequence 1 and the second battery sequence 2 are accommodated and fixed in the frame.

The busbar assembly 5 includes a first busbar component 51, a second busbar component 52, and a third busbar component 53. The first busbar component 51 is connected to the first electrode terminal 111. The second busbar component 52 is connected to the second electrode terminal 211. The third busbar component 53 connects the first electrode terminal 111 and the second electrode terminal 211.

Specifically, there may be a plurality of first busbar components 51. One first busbar component 51 may connect a first positive terminal 1111 of one first battery 11 and a first negative terminal 1112 of another first battery 11, thereby serial-connecting the two first batteries 11 together. Alternatively, one first busbar component 51 may also connect first positive terminals 1111 of two first batteries 11, thereby parallel-connecting the two first batteries 11. The plurality of first busbar components 51 serial-connects (and/or parallel-connects) the plurality of first batteries 11 together by connecting to the first electrode terminal 111. Similarly, there may be a plurality of second busbar components 52. The second busbar components 52 serial-connects (and/or parallel-connects) the plurality of second batteries 21 together by connecting to the second electrode terminal 211.

The third busbar component 53 connects the first electrode terminal 111 and the second electrode terminal 211, thereby electrically connecting the first battery sequence 1 and the second battery sequence 2. The first busbar component 51, the second busbar component 52, and the third busbar component 53 gather currents of the plurality of first batteries 11 and the plurality of second batteries 21.

The first output electrode component 3 is connected to the first electrode terminal 111 of the first battery 11. The second output electrode component 4 is connected to the second electrode terminal 211 of the second battery 21. The first battery 11 connected to the first output electrode component 3 and the second battery 21 connected to the second output electrode component 4 are located at the same end of the battery module along the longitudinal direction Y. Polarity of the first electrode terminal 111 connected to the first output electrode component 3 is opposite to polarity of the second electrode terminal 211 connected to the second output electrode component 4. The first output electrode component 3 and the second output electrode component 4 are configured to charge and discharge the battery module.

By arranging the batteries in two rows (that is, the first battery sequence 1 and the second battery sequence 2), this application can not only increase the capacity of the battery module, but also dispose the first output electrode component 3 and the second output electrode component 4 at the same end of the battery module along the longitudinal direction Y to achieve the same-side output of the battery module and simplify the connection structure between battery modules.

The first output electrode component 3 extends beyond an outer side of the first battery sequence 1 along the longitudinal direction Y so as to conveniently connect to other components (for example, another battery module). Similarly, the second output electrode component 4 extends beyond an outer side of the second battery sequence 2 along the longitudinal direction Y so as to conveniently connect to other components (for example, another battery module).

The two first electrode terminals 111 are located on the same side of the first battery 11. For example, the two first electrode terminals 111 are both disposed on an upper side of the first battery 11 along a height direction Z. Similarly, the two second electrode terminals 211 are both disposed on an upper side of the second battery 21 along the height direction Z.

The battery module further includes a harness plate disposed on the upper side of the first battery sequence 1 and the second battery sequence 2. The busbar assembly 5 is fixed onto a lower side of the harness plate. The harness plate can collect information (such as voltage and current) of each battery through the first busbar component 51, the second busbar component 52, and the third busbar component 53.

The battery module further includes a spacer plate 6 disposed between the first battery sequence 1 and the second battery sequence 2. Two ends of the spacer plate 6 along the longitudinal direction Y are fixed onto the end plates 7. In a working process of the battery module, both the first battery 11 and the second battery 21 swell. A swelling force may cause a failure of the connection between an end plate 7 and a side plate 8. The spacer plate 6 can improve an anti-swelling capability of the battery module and prevent failure of the battery module.

The battery module may further include a bottom plate and an upper cover (not shown). The top cover is fixed onto an upper side of the harness plate to protect the harness plate and the busbar assembly 5. The bottom plate is disposed on a lower side of the first battery sequence 1 and the second battery sequence 2 and fixed onto the end plates 7.

Figure 2:
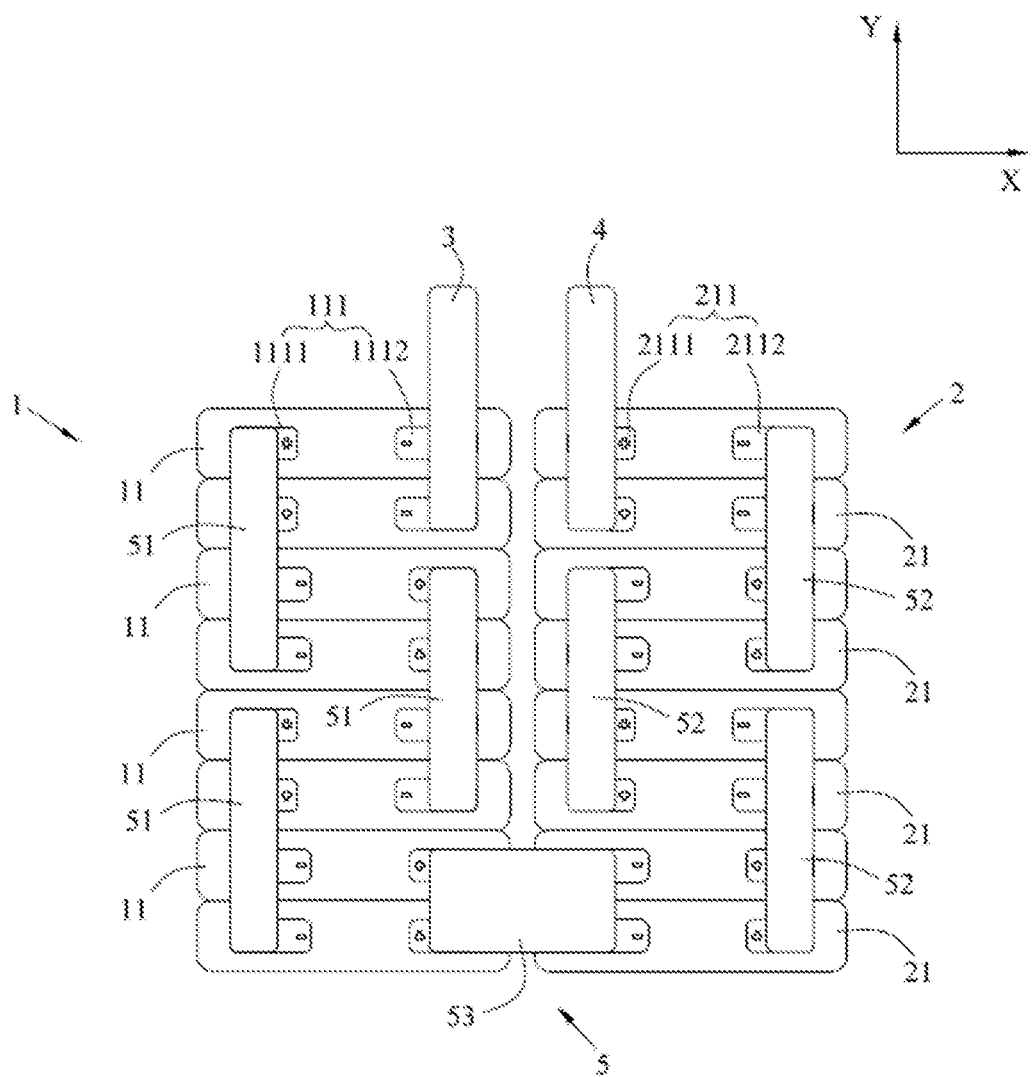
FIG. 2 is a schematic diagram of a second embodiment of a battery module according to this application.

Referring to FIG. 2, a second embodiment of this application is substantially the same as the first embodiment, but differs in the busbar assembly 5.

The first busbar component 51 can connect the first positive terminals 1111 of two (or more) first batteries 11 and the first negative terminals 1112 of two (or more) first batteries 11 concurrently, thereby connecting the four first batteries 11 together in a serial-parallel manner. It is the same with the second busbar component 52 and the third busbar component 53.

In this embodiment, there may also be a plurality of first batteries 11 connected to the first output electrode component 3 and a plurality of second batteries 21 connected to the second output electrode component 4.

Referring to FIG. 3 to FIG. 10, in a third embodiment, a battery module includes a first battery sequence 1, a second battery sequence 2, a first output electrode component 3, a second output electrode component 4, a busbar assembly 5, end plates 7 (not shown), and side plates 8 (not shown). The first battery sequence 1 includes a plurality of first batteries 11 arranged along a longitudinal direction Y of the battery module. The second battery sequence 2 includes a plurality of second batteries 21 arranged along the longitudinal direction Y. The first battery sequence 1 and the second battery sequence 2 are laid out along a transverse direction X of the battery module that is perpendicular to the longitudinal direction.

The first batteries 11 include two first electrode terminals 111, that is, a first positive terminal 1111 and a first negative terminal 1112. The second batteries 21 include two second electrode terminals 211, that is, a second positive terminal 2111 and a second negative terminal 2112. Two end plates 7 and two side plates 8 are interconnected to form a frame. The first battery sequence 1 and the second battery sequence 2 are accommodated and fixed in the frame.

Figure 5:
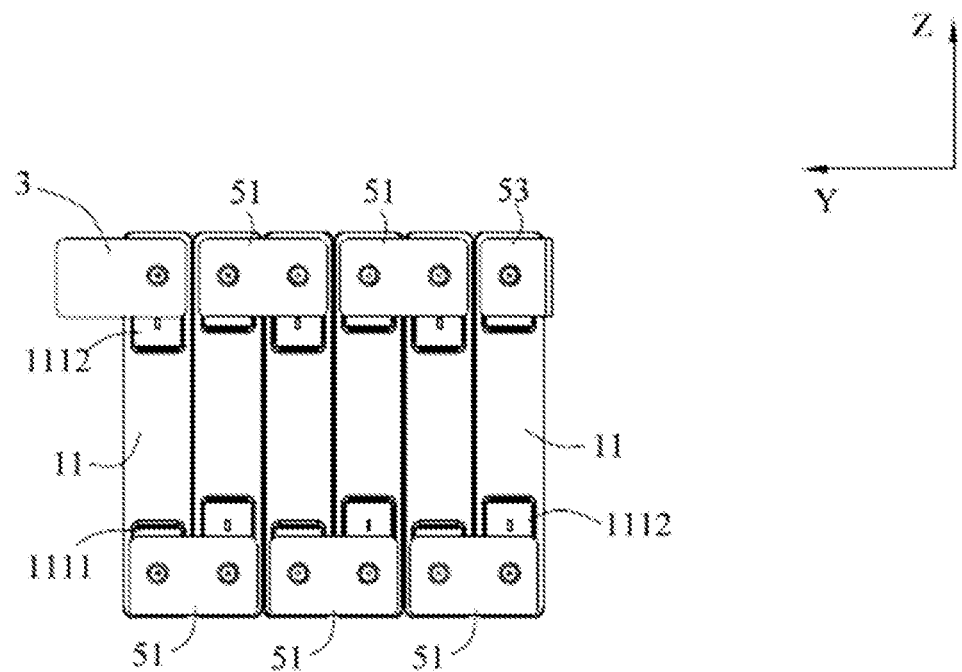
FIG. 5 is a schematic diagram of a first battery sequence of the battery module in FIG. 3.
Figure 6:
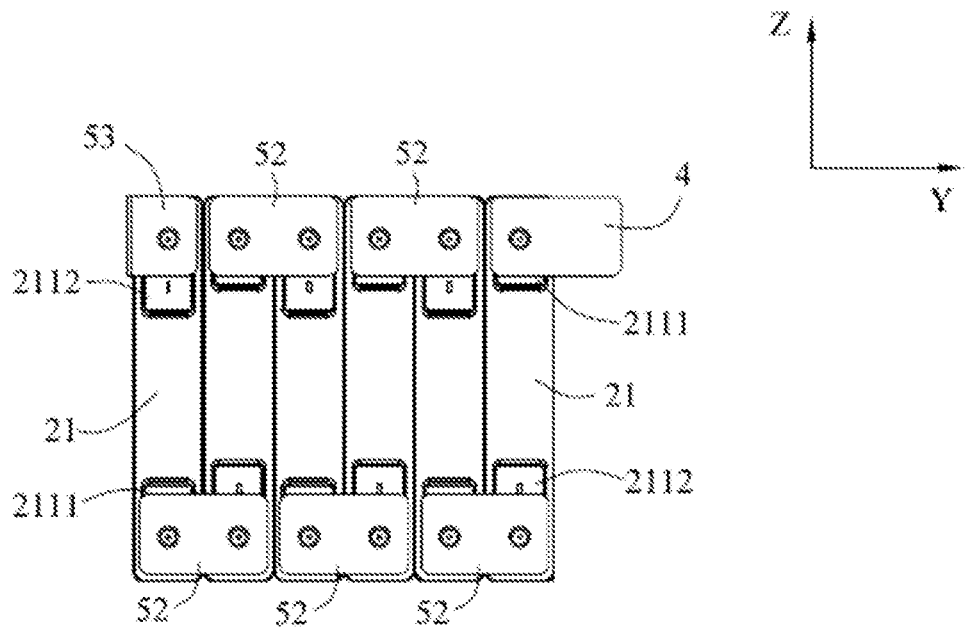
FIG. 6 is a schematic diagram of a second battery sequence of the battery module in FIG. 3.
Figure 7:
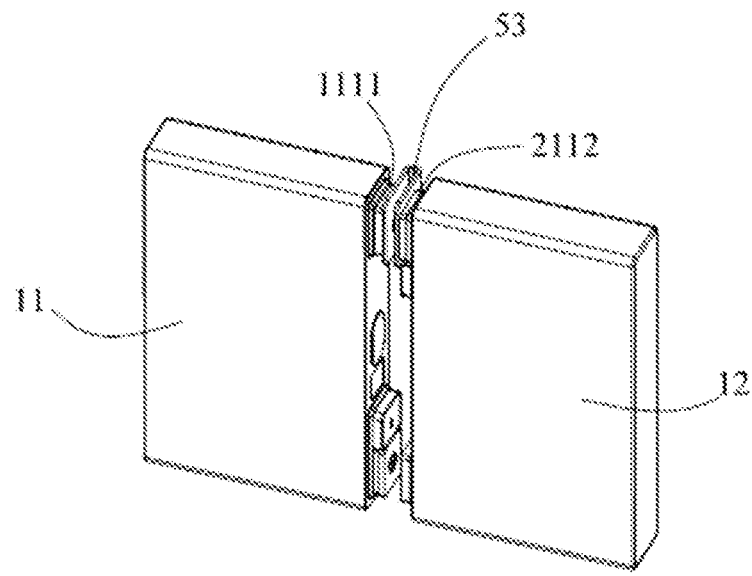
FIG. 7 is a schematic connection diagram of a first battery, a second battery, and a third busbar component.

Referring to FIG. 5 to FIG. 7, the busbar assembly 5 includes a first busbar component 51, a second busbar component 52, and a third busbar component 53. The first busbar component 51 is connected to the first electrode terminal 111. The second busbar component 52 is connected to the second electrode terminal 211. The third busbar component 53 connects the first electrode terminal 111 and the second electrode terminal 211.

The first output electrode component 3 is connected to the first electrode terminal 111 of the first battery 11. The second output electrode component 4 is connected to the second electrode terminal 211 of the second battery 21. The first battery 11 connected to the first output electrode component 3 and the second battery 21 connected to the second output electrode component 4 are located at the same end of the battery module along the longitudinal direction Y. Polarity of the first electrode terminal 111 connected to the first output electrode component 3 is opposite to polarity of the second electrode terminal 211 connected to the second output electrode component 4. The first output electrode component 3 and the second output electrode component 4 are configured to charge and discharge the battery module.

Figure 3:
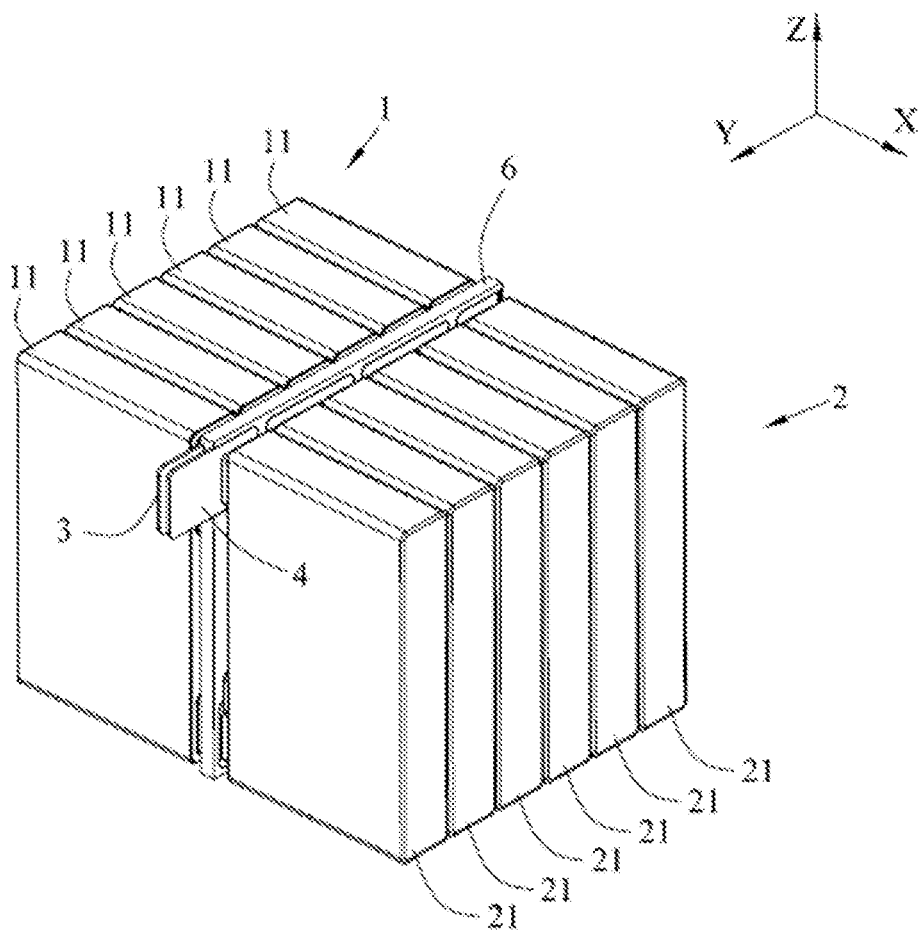
FIG. 3 is a schematic diagram of a third embodiment of a battery module according to this application.

Referring to FIG. 3, the first output electrode component 3 extends beyond an outer side of the first battery sequence 1 along the longitudinal direction Y so as to conveniently connect to other external components; and the second output electrode component 4 extends beyond an outer side of the second battery sequence 2 along the longitudinal direction Y so as to conveniently connect to other external components.

Figure 4:
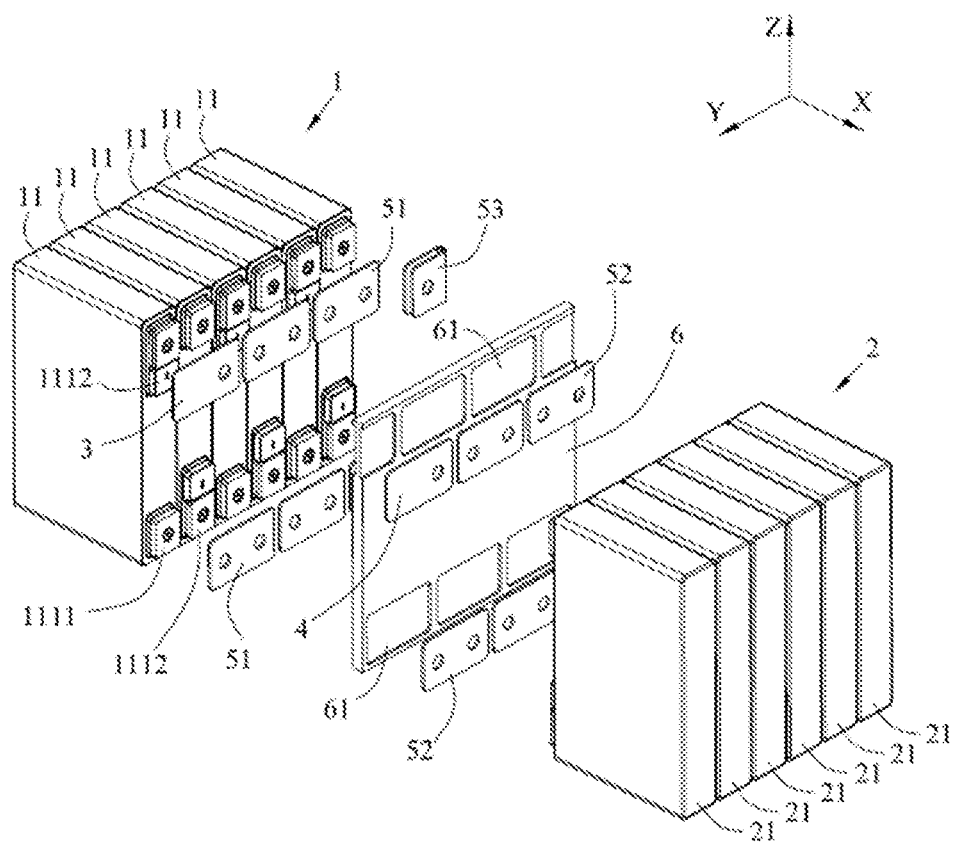
FIG. 4 is an exploded view of the battery module in FIG. 3.

Referring to FIG. 4, the first electrode terminal 111 of the first battery 11 and the second electrode terminal 211 of the second battery 21 are disposed opposite to each other along the transverse direction X. That is, in the transverse direction X, the two first electrode terminals 11 are both located on a side that is of the first battery 11 and that is close to the second battery 21, and the two second electrode terminals 211 are both located on a side that is of the second battery 21 and that is close to the first battery 11.

The busbar assembly 5 is disposed between the first battery sequence 1 and the second battery sequence 2. Because the first electrode terminal 111 and the second electrode terminal 211 are disposed opposite to each other along the transverse direction X, the first busbar component 51 and the second busbar component 52 overlap along the transverse direction X, and the first output electrode component 3 and the second output electrode component 4 also overlap along the transverse direction X.

The battery module further includes a spacer plate 6 disposed between the first battery sequence 1 and the second battery sequence 2. The spacer plate 6 separates the first busbar component 51 from the second busbar component 52 to avoid contact between the first busbar component 51 and the second busbar component 52 and prevent a short circuit. The spacer plate 6 also separates the first output electrode component 3 from the second output electrode component 4 to avoid contact between the first output electrode component 3 and the second output electrode component 4 and prevent a short circuit.

A limiting slot 61 is disposed on the spacer plate 6. The first output electrode component 3, the second output electrode component 4, and the busbar assembly 5 are at least partly accommodated in the limiting slot 61. The limiting slot 61 serves a function of fixing a position, and is conducive to assembling the spacer plate 6, the first output electrode component 3, the second output electrode component 4, and the busbar assembly 5. With the limiting slot 61, the spacer plate 6 can also support the first output electrode component 3, the second output electrode component 4, and the busbar assembly 5.

In this embodiment, the spacer plate 6 may be an insulated harness plate. The harness plate can collect information (such as voltage and current) of each battery through the first busbar component 51, the second busbar component 52, and the third busbar component 53.

The battery module may further include a bottom plate and an upper cover (not shown). The upper cover is disposed on an upper side of the first battery sequence 1 and the second battery sequence 2 and fixed onto the end plates 7. The bottom plate is disposed on a lower side of the first battery sequence 1 and the second battery sequence 2 and fixed onto the end plates 7.

In the first embodiment, the upper cover is generally fixed to the harness plate to protect the harness plate, and therefore, the upper cover generally cannot fix the first battery sequence 1 or the second battery sequence 2 from the upper side. However, in the third embodiment, the spacer plate 6 is clamped between the first battery sequence 1 and the second battery sequence 2, and the upper cover does not need to protect the harness plate, and therefore, the upper cover may be directly connected to the end plates 7 and fix the first battery sequence 1 and the second battery sequence 2 from the upper side, so as to improve overall strength of the battery module.

Referring to FIG. 7, because the first electrode terminal 111 and the second electrode terminal 211 are disposed opposite to each other along the transverse direction X, the third busbar component 53 is generally a bent structure in order to connect the first electrode terminal 111 and the second electrode terminal 211.

Figure 8:
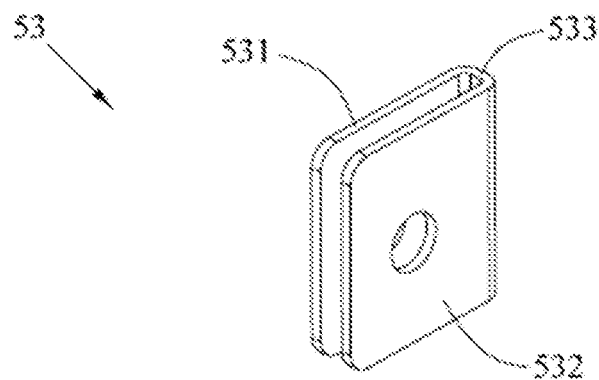
FIG. 8 to FIG. 10 are schematic diagrams of different embodiments of a third busbar component.

Referring to FIG. 8, the third busbar component 53 includes a first part 531, a second part 532, and a third part 533. The first part 531 is connected to the first battery 11. The second part 532 is connected to the second battery 21. The third part 533 is bent against the first part 531 and the second part 532, and the third part 533 connects the first part 531 and the second part 532.

Preferably, the third busbar component 53 is a U-shaped integrated component, the first part 531 and the second part 532 take on a flat plate shape, and the third part 533 takes on a curved shape.

Figure 9:
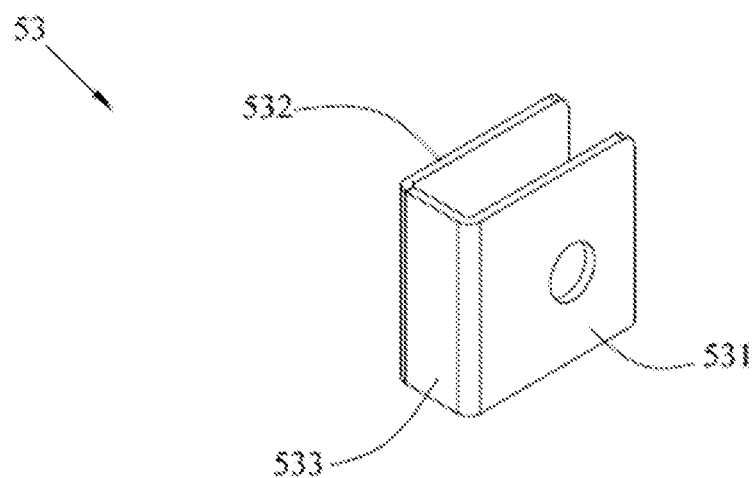

Alternatively, referring to FIG. 9, the first part 531 and the third part 533 are an L-shaped integrated component, and the third part 533 is connected to the second part 532. Specifically, during assembly, the first part 531 may be welded to the first electrode terminal 111 and the second part 532 may be welded to the second electrode terminal 211 first, and then welding is performed along a boundary between the third part 533 and the second part 532.

Figure 10:
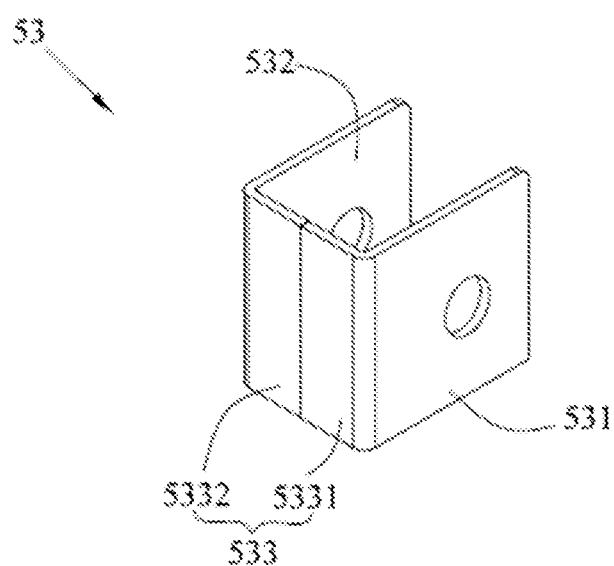

Alternatively, referring to FIG. 10, the third part 533 includes a first connecting region 5331 and a second connecting region 5332. The first part 531 and the first connecting region 5331 are an L-shaped integrated component. The second part 532 and the second connecting region 5332 are an L-shaped integrated component. The first connecting region 5331 is connected to the second connecting region 5332.

The spacer plate 6 separates the first part 531 from the second part 532. The third part 533 is located on an outer side of the spacer plate 6 along the longitudinal direction Y. The spacer plate 6 can reduce vibration of the first part 531 and the second part 532 along the transverse direction X.

The first output electrode component 3 is flush with the second output electrode component 4 along a height direction Z, thereby further simplifying a connection structure between two battery modules.

What is claimed is:

1. A battery module, comprising a first battery sequence, a second battery sequence, a first output electrode component, a second output electrode component, and a busbar assembly;

the first battery sequence comprises a plurality of first batteries arranged along a longitudinal direction of the battery module, the second battery sequence comprises a plurality of second batteries arranged along the longitudinal direction, and the first battery sequence and the second battery sequence are laid out along a transverse direction of the battery module that is perpendicular to the longitudinal direction;

the first batteries comprise a first electrode terminal, and the second batteries comprise a second electrode terminal;

the busbar assembly comprises a first busbar component, a second busbar component, and a third busbar component, the first busbar component is connected to the first electrode terminal, the second busbar component is connected to the second electrode terminal, and the third busbar component connects the first electrode terminal and the second electrode terminal; and the first output electrode component is connected to the first electrode terminal of a first battery within the first battery sequence, the second output electrode component is connected to the second electrode terminal of a second battery within the second battery sequence, and the first battery connected to the first output electrode component and the second battery connected to the second output electrode component are located at the same end of the battery module along the longitudinal direction.

2. The battery module according to claim 1, wherein the first output electrode component extends beyond an outer side of the first battery sequence along the longitudinal direction, and the second output electrode component extends beyond an outer side of the second battery sequence along the longitudinal direction.

3. The battery module according to claim 1, wherein the first electrode terminal of the first battery and the second electrode terminal of the second battery are disposed opposite to each other along the transverse direction; and
the busbar assembly is disposed between the first battery sequence and the second battery sequence.

4. The battery module according to claim 3, wherein the battery module further comprises a spacer plate disposed between the first battery sequence and the second battery sequence, and the spacer plate separates the first busbar component from the second busbar component, and separates the first output electrode component from the second output electrode component.

5. The battery module according to claim 4, wherein a limiting slot is disposed on the spacer plate, and the first output electrode component, the second output electrode component, and the busbar assembly are at least partly accommodated in the limiting slot.

6. The battery module according to claim 4, wherein the third busbar component comprises a first part, a second part, and a third part, the first part is connected to the first battery, the second part is connected to the second battery, and the third part connects the first part and the second part.

7. The battery module according to claim 6, wherein the third busbar component is a U-shaped integrated component.

8. The battery module according to claim 6, wherein the first part and the third part are an L-shaped integrated component, and the third part is connected to the second part.

9. The battery module according to claim 6, wherein the third part comprises a first connecting region and a second connecting region, the first part and the first connecting region are an L-shaped integrated component, the second part and the second connecting region are an L-shaped integrated component, and the first connecting region is connected to the second connecting region.

10. The battery module according to claim 6, wherein the spacer plate separates the first part from the second part, and the third part is located on an outer side of the spacer plate along the longitudinal direction.

11. The battery module according to claim 3, wherein the first output electrode component is flush with the second output electrode component along a height direction of the battery module.

12. The battery module according to claim 1, wherein the first electrode terminal is disposed on an upper side of the first battery along a height direction of the battery module, and the second electrode terminal is disposed on an upper side of the second battery along the height direction; and the battery module further comprises a spacer plate disposed between the first battery sequence and the second battery sequence.

13. The battery module according to claim 1, wherein the first battery includes two first electrode terminals located on the same side of the first battery along the longitudinal direction.

14. The battery module according to claim 4, further comprising
two end plates and two side plates that are interconnected to form a frame for accommodating the first battery sequence and the second battery sequence along the longitudinal direction.

15. The battery module according to claim 14, wherein the space plate is disposed between the first battery sequence and the second battery sequence and two ends of the spacer plate are fixed onto the end plates along the longitudinal direction.

16. The battery module according to claim 1, wherein the first busbar component is plural, each first busbar component connecting two or more first positive terminals of a first group of adjacent batteries within the first battery sequence or two or more first negative terminals of a second group of adjacent batteries within the first battery sequence.

17. The battery module according to claim 16, wherein the first group of adjacent batteries within the first battery sequence include at least one battery of the second group of adjacent batteries within the first battery sequence.

18. The battery module according to claim 16, wherein the first group of adjacent batteries within the first battery sequence include at least one battery not of the second group of adjacent batteries within the first battery sequence.

19. The battery module according to claim 1, further comprising
a harness plate disposed on an upper side of the first battery sequence and the second battery sequence, wherein the busbar assembly is fixed onto a lower side of the harness plate.

20. A battery pack, comprising one or more battery modules according to claim 1.

* * * * *